(12) United States Patent
Igasaki et al.

(10) Patent No.: US 11,474,285 B2
(45) Date of Patent: Oct. 18, 2022

(54) VARIABLE FOCAL LENGTH LENS DEVICE AND VARIABLE FOCAL LENGTH LENS CONTROL METHOD

(71) Applicant: MITUTOYO CORPORATION, Kanagawa (JP)

(72) Inventors: Shiro Igasaki, Kanagawa (JP); Yuki Kurahashi, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 130 days.

(21) Appl. No.: 17/141,507

(22) Filed: Jan. 5, 2021

(65) Prior Publication Data

US 2021/0173129 A1 Jun. 10, 2021

(30) Foreign Application Priority Data

Dec. 5, 2019 (JP) .............................. JP2019-220239

(51) Int. Cl.
*G02B 3/14* (2006.01)
*G02B 7/10* (2021.01)

(52) U.S. Cl.
CPC .................... *G02B 3/14* (2013.01); *G02B 7/10* (2013.01)

(58) Field of Classification Search
CPC . G02B 3/14; G02B 7/10; G02B 7/028; G02B 26/004
See application file for complete search history.

(56) References Cited

U.S. PATENT DOCUMENTS 10,281,700 B1 * 5/2019 Nahum .................. G02B 7/102

FOREIGN PATENT DOCUMENTS

JP 2018-189700 11/2018

* cited by examiner

*Primary Examiner* — James C. Jones
(74) *Attorney, Agent, or Firm* — Greenblum & Bernstein, P.L.C.

(57) ABSTRACT

A variable focal length lens device includes: a lens system of a liquid resonant type whose refractive index is changed in response to a drive signal to be inputted; a temperature sensor configured to acquire temperature information of the lens system; and a drive controller configured to control the lens system. The drive controller includes: a resonant frequency estimation unit configured to calculate an estimated value of a resonant frequency of the lens system on a basis of the temperature information; and a starting frequency setting unit configured to set a starting frequency of the lens system on a basis of the estimated value of the resonant frequency.

5 Claims, 11 Drawing Sheets

VARIABLE FOCAL LENGTH LENS DEVICE AND VARIABLE FOCAL LENGTH LENS CONTROL METHOD

The entire disclosure of Japanese Patent Application No. 2019-220239 filed Dec. 5, 2019 is expressly incorporated by reference herein.

TECHNICAL FIELD

The present invention relates to a variable focal length lens device and a variable focal length lens control method.

BACKGROUND ART

A variable focal length lens device in which a liquid resonant lens system is combined with an objective lens has been known (for instance, see Patent Literature 1: JP 2018-189700 A).This liquid resonant lens system includes a cylindrical oscillator made of a piezoelectric material immersed in a transparent liquid. When an alternating-current voltage in a form of a drive signal is applied to the oscillator, a standing wave is formed in the liquid inside the oscillator to periodically change a refractive index of the liquid. A focal length of the variable focal length lens device periodically changes concurrently with the change in the refractive index of the lens system, on a basis of a focal length of an objective lens.

In order to generate a standing wave in the lens system in the above-described variable focal length lens device, a frequency of the drive signal needs to be adjusted to a resonant frequency of the lens system. Accordingly, in a typical technology described in Patent Literature 1 or the like, when the lens system is started, a frequency scanning process is performed to search for the resonant frequency of the lens system by sweeping the frequency of the drive signal.

Figure 10:
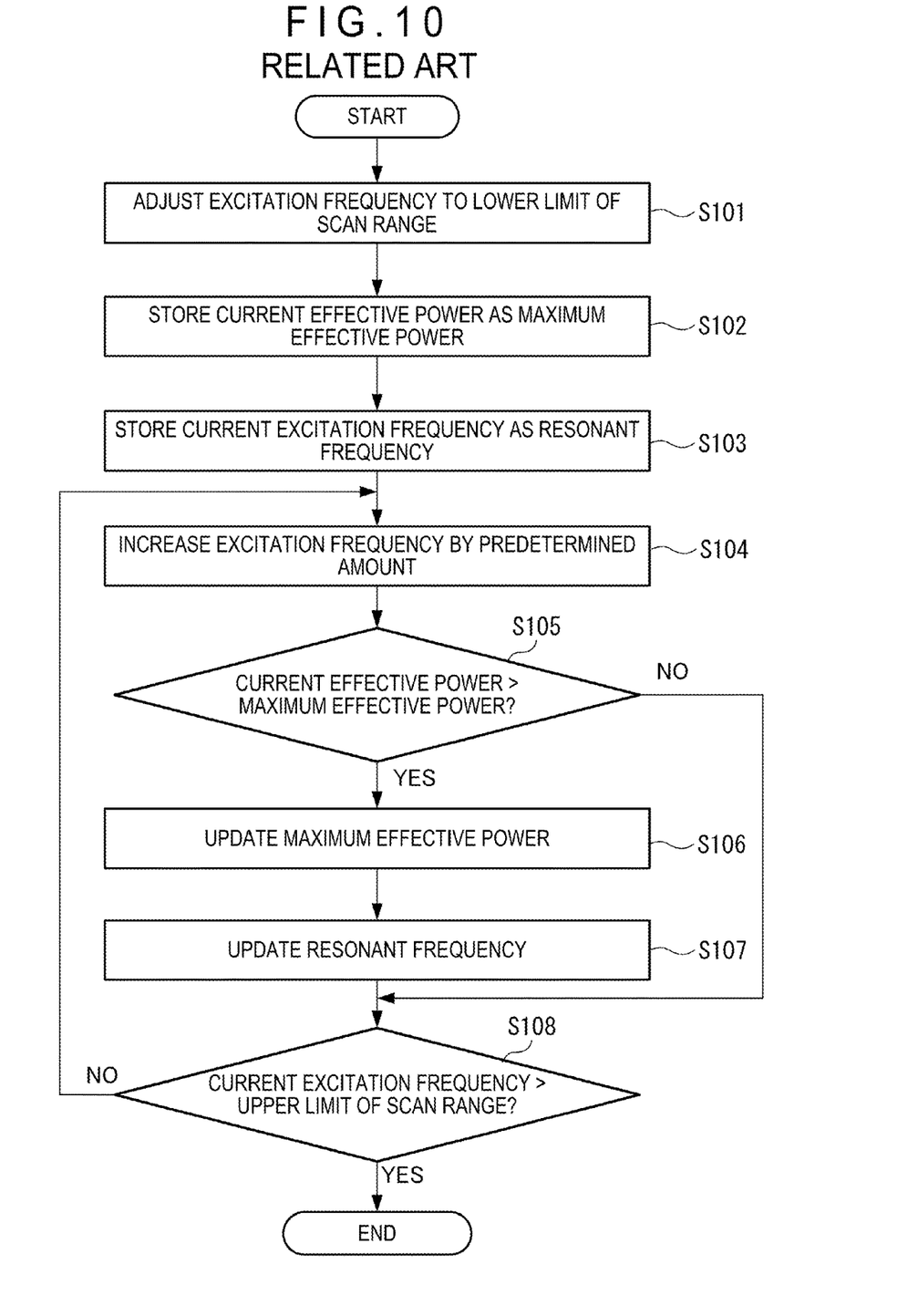
FIG. 10 is a flow chart showing steps of a typical frequency scanning process.

FIG. 10 is a flow chart showing detailed steps of the frequency scanning process in a typical technology.

In a variable focal length lens device as shown in FIG. 10, first, a frequency (excitation frequency) of the drive signal is adjusted to a lower limit fmin in a scan range (Step S101), a current effective power in the lens system in this state is stored as the maximum effective power (Step S102), and a current excitation frequency is stored as a resonant frequency (Step S103).

Subsequently, the excitation frequency is increased by a predetermined amount (Step S104), and it is judged whether the current effective power in the lens system is larger than the value stored as the maximum effective power (Step S105).When the judgement in Step S105 is Yes, the value stored as the maximum effective power is updated to determine the current effective power (Step S106), and the value stored as the resonant frequency is updated to determine the current excitation frequency (Step S107) to proceed to Step S108. On the other hand, when the judgement in Step S105 is No, the process proceeds directly to Step S108. In Step S108, it is judged whether the current excitation frequency is larger than the upper limit fmax in the scan range. When the judgement is Yes, the frequency scanning process ends. When the judgement is No, the process returns to Step S104.

Figure 11:
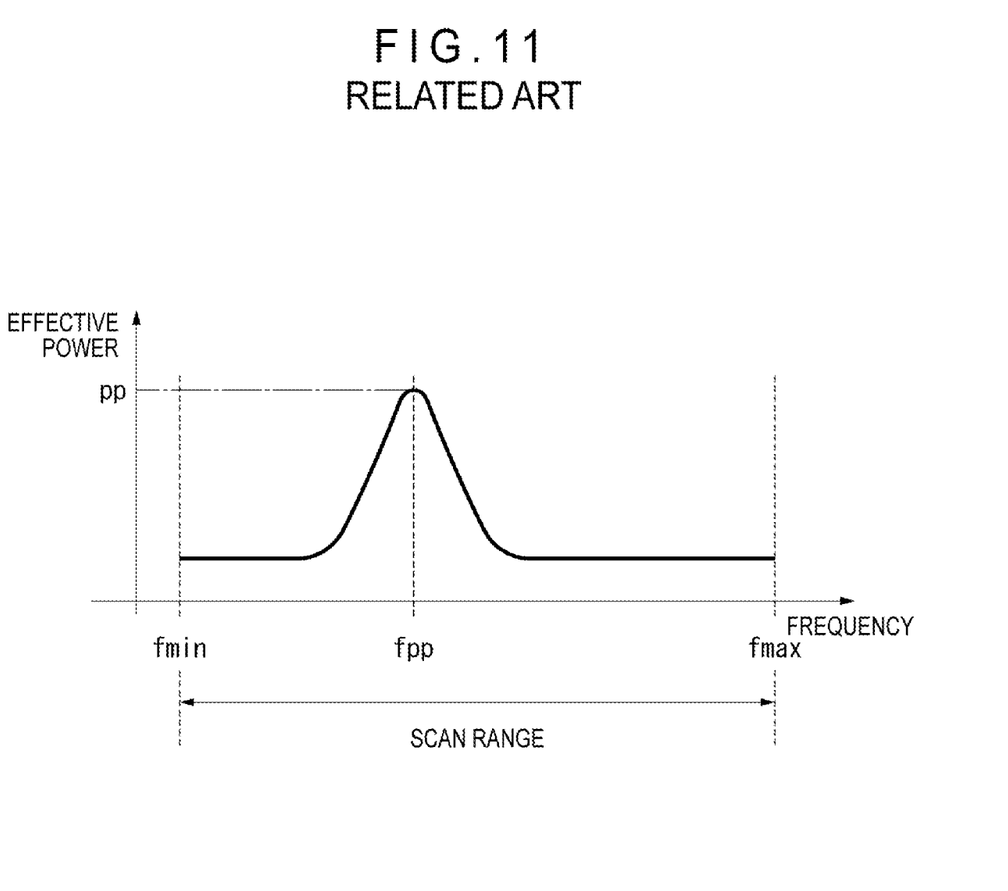
FIG. 11 is a graph for explaining a typical frequency scanning process.

In accordance with the above frequency scanning process, a peak value pp of the effective power is stored as the maximum effective power and a frequency fpp at which the peak value pp is obtained is stored as the resonant frequency as shown in FIG. 11.

However, the resonant frequency of the lens system changes depending on the temperature of the lens system. For this reason, a typical frequency scanning process requires a wide scan range such that the resonant frequency can be detected irrespective of the temperature of the lens system in a guaranteed temperature range. Accordingly, the time required for the frequency scanning process is prolonged, and consequently, the time required for starting the lens system is prolonged.

SUMMARY OF INVENTION

An object of the invention is to provide a variable focal length lens device and a control method of the variable focal length lens device, which are capable of shortening a time required for starting a lens system.

According to an aspect of the invention, a variable focal length lens device includes:

a lens system of a liquid resonant type whose refractive index is changed in response to a drive signal to be inputted; a temperature sensor configured to acquire temperature information of the lens system; a resonant frequency estimation unit configured to calculate an estimated value of a resonant frequency of the lens system on a basis of the temperature information; and a starting frequency setting unit configured to set a starting frequency of the lens system on a basis of the estimated value.

In the variable focal length lens device according to the above aspect, the starting frequency setting unit may set a scan range including the estimated value, detect a frequency of the drive signal, at which the lens system is in a target oscillation state, within the scan range, and set the frequency as the starting frequency.

The variable focal length lens device according to the above aspect may further include: a resonance-lock controller configured to control the drive signal to follow the resonant frequency of the lens system during working of the lens system; and an elapsed time judging unit configured to judge, after the lens system stops, whether a predetermined time has elapsed since a stop time of the lens system, in which the starting frequency setting unit sets the starting frequency on a basis of the estimated value when it is judged that the predetermined time has elapsed, and sets the starting frequency at a frequency adjusted by the resonance-lock controller immediately before the lens system stops when it is judged that the predetermined time has not elapsed.

The variable focal length lens device according to the above aspect may further include: a resonance-lock controller configured to control the drive signal to follow the resonant frequency of the lens system during working of the lens system; and a temperature change judging unit configured to judge whether a difference between the temperature information of the lens system at a current time and the temperature information of the lens system at a last time when the lens system stops working falls within a predetermined range, in which the starting frequency setting unit sets the starting frequency at a frequency adjusted by the resonance-lock controller immediately before the lens system stops when it is judged that the difference falls within the predetermined range, and sets the starting frequency on a basis of the estimated value when it is judged that the difference falls out of the predetermined range.

According to another aspect of the invention, a variable focal length lens control method by using a variable focal length lens device including: a lens system of a liquid resonant type whose refractive index is changed in response to a drive signal to be inputted; and a temperature sensor configured to acquire temperature information of the lens system, includes: calculating an estimated value of a resonant frequency of the lens system on a basis of the temperature information; and setting a starting frequency of the lens system on a basis of the estimated value.

DESCRIPTION OF EMBODIMENT(S)

Exemplary embodiments of the invention will be described below with reference to the attached drawings.

First Exemplary Embodiment

Figure 1:
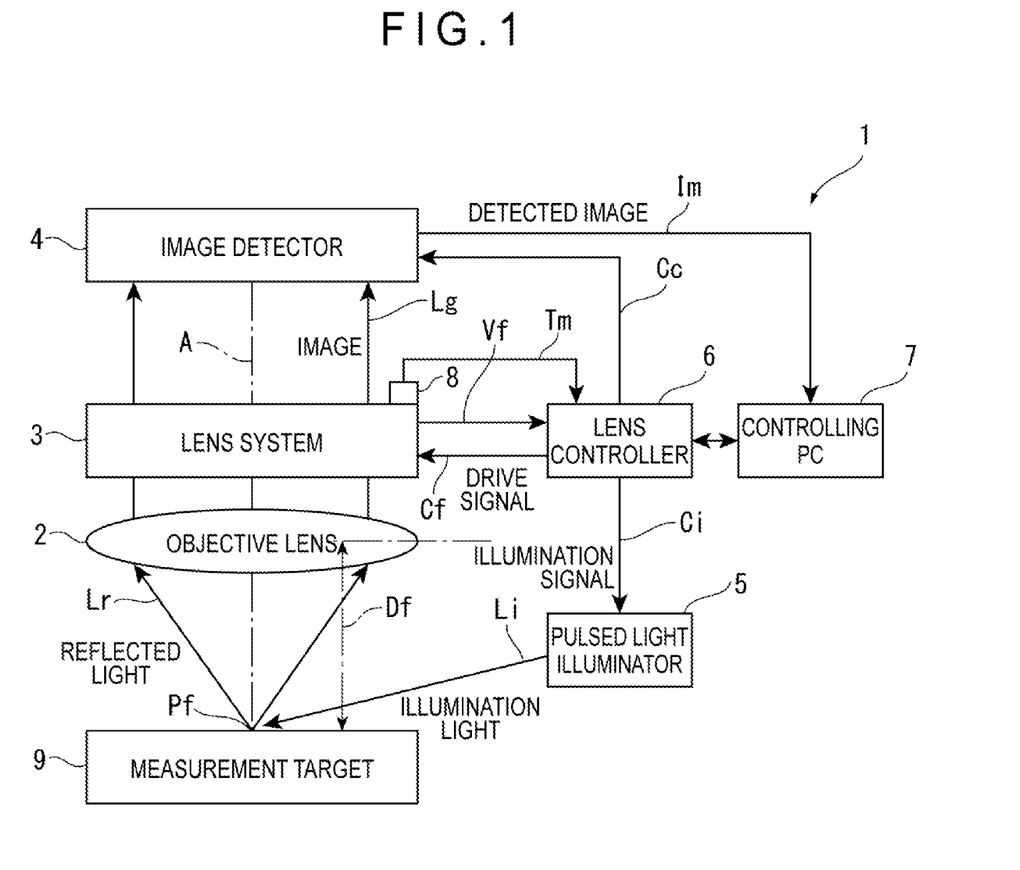
FIG. 1 schematically shows a variable focal length lens device according to a first exemplary embodiment of the invention.

FIG. 1 shows an overall configuration of a variable focal length lens device 1 according to a first exemplary embodiment of the invention. The variable focal length lens device 1 is configured to detect an image of a surface of a measurement target 9 placed in an imaging area while periodically varying a focal length Df extending to a focus position Pf.

Configuration of Variable Focal Length Lens Device

As shown in FIG. 1, the variable focal length lens device 1 includes: an objective lens 2, a lens system 3 and an image detector 4 which are disposed on a common optical axis A intersecting with a surface of the measurement target 9; a pulsed light illuminator 5 configured to apply a pulsed illumination on the surface of the measurement target 9; a lens controller 6 configured to control operations of the lens system 3 and the like; a controlling PC 7 configured to operate the lens controller 6; and a temperature sensor 8 configured to measure a temperature of the lens system 3.

The objective lens 2 is in a form of an existing convex lens or a group of lenses.

The lens system 3 is a lens system of a liquid resonant type, and is configured to change a refractive index thereof in response to a drive signal Cf to be inputted from the lens controller 6. The drive signal Cf is a sinusoidal alternating-current signal to oscillate an oscillator included in the lens system 3. When a frequency (excitation frequency) of the drive signal Cf is adjusted to a resonant frequency of the lens system 3, a standing wave is generated in a liquid inside the lens system 3 so that a refractive index of the liquid periodically changes.

In the variable focal length lens device 1 of the exemplary embodiment, the focal length Df extending to the focus position Pf periodically changes on a basis of a focal length of the objective lens 2 according to the change in the refractive index of the lens system 3.

The image detector 4 includes an existing charge coupled device (CCD) image sensor, another type of a camera or the like. The image detector 4 is configured to receive an image Lg of the measurement target 9 through the objective lens 2 and the lens system 3, detect the image Lg, and output the image Lg in a form of a detected image Im of a predetermined signal format to the controlling PC 7.

The pulsed light illuminator 5 includes a light-emitting device such as an LED (Light Emitting Diode).The pulsed light illuminator 5 emits an illumination light Li for a predetermined time to apply a pulsed illumination on the surface of the measurement target 9. A reflected light Lr that has been reflected on the measurement target 9 forms the image Lg by the objective lens 2 and the lens system 3 to enter the image detector 4.

In the variable focal length lens device 1, the driving of the lens system 3, the illumination of the pulsed light illuminator 5 and the image detection of the image detector 4 are respectively controlled by the drive signal Cf, an illumination signal Ci and an image detection signal Cc outputted from the lens controller 6. The controlling PC 7 is connected to the lens controller 6 in order to, for instance, configure settings of the lens controller 6 that controls the driving of the lens system 3, the illumination of the pulsed light illuminator 5 and the image detection of the image detector 4.

The temperature sensor 8 is a sensor configured to measure temperature information Tm of the lens system 3. The temperature sensor 8 may be provided to an outside of the lens system 3 and measure a surface temperature of the lens system 3. Alternatively, the temperature sensor 8 may be provided inside the lens system 3 and measure a temperature of the liquid inside the lens system 3.

Further alternatively, the temperature sensor 8 may be provided so as to measure an ambient temperature of the lens system 3. In other words, in the exemplary embodiment, since the lens system 3 is provided indoors and the temperature information Tm acquired before the lens system 3 is used, the temperature of the lens system 3 can be recognized to be the same as the ambient temperature.

The temperature sensor 8 outputs the acquired temperature information Tm to the lens controller 6. The lens controller 6 starts the lens system 3 on a basis of the inputted temperature information Tm.

Figure 2:
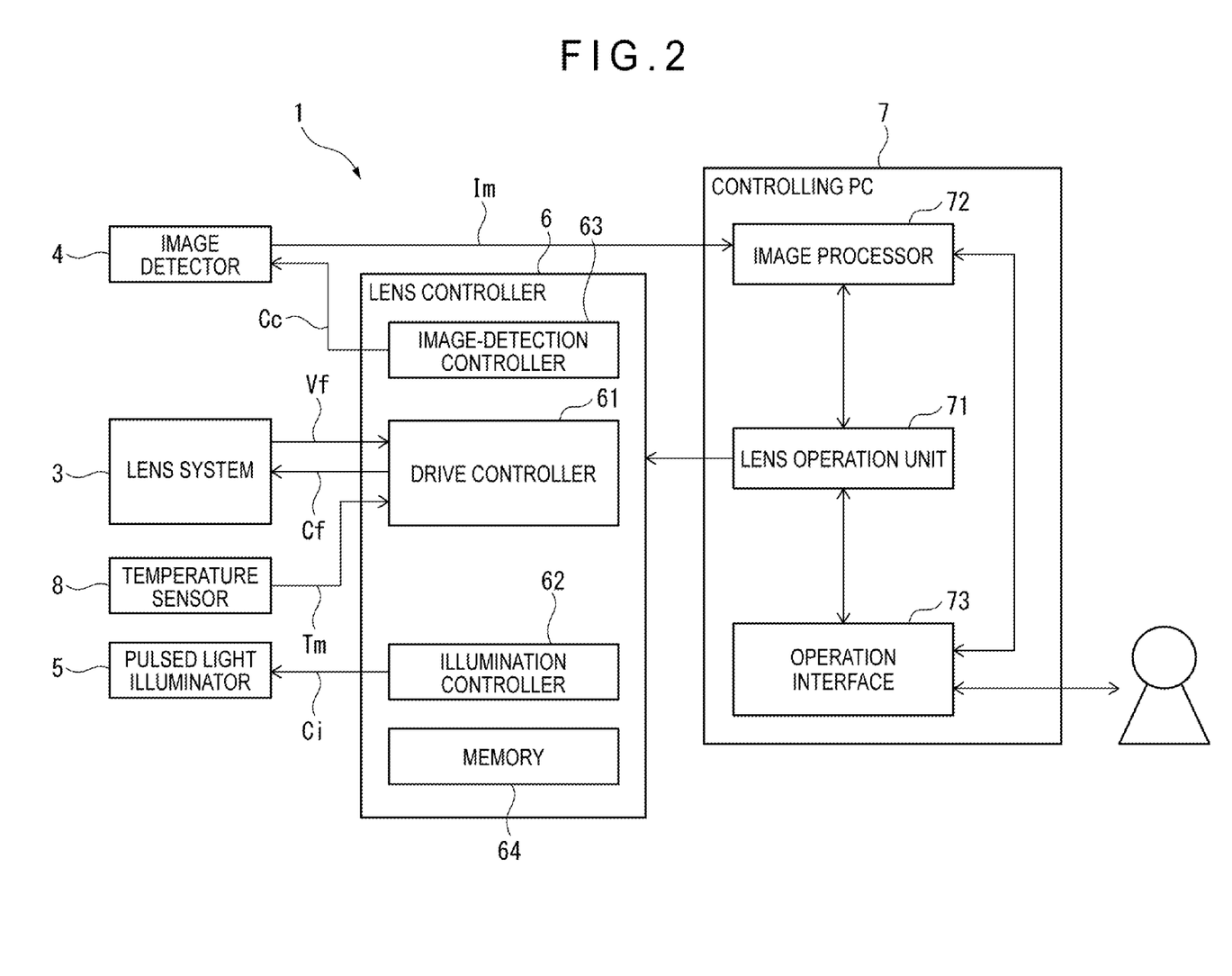
FIG. 2 is a block diagram showing the variable focal length lens device in the first exemplary embodiment.

FIG. 2 shows a configuration of the lens controller 6 and the controlling PC 7 in the exemplary embodiment.

The lens controller 6 is a dedicated unit configured to control the operations of the lens system 3, the image detector 4 and the pulsed light illuminator 5. The lens controller 6 may be in a form of hardware including a plurality of ICs or the like, or may be configured mainly by a computer equipped with a CPU to be realized by executing a program stored in a memory 64 using the CPU.

The lens controller 6 includes: a drive controller 61 configured to output the drive signal Cf to the lens system 3;

an illumination controller 62 configured to output the illumination signal Ci to the pulsed light illuminator 5; an image-detection controller 63 configured to output the image detection signal Cc to the image detector 4; and the memory 64 storing various information.

Figure 3:
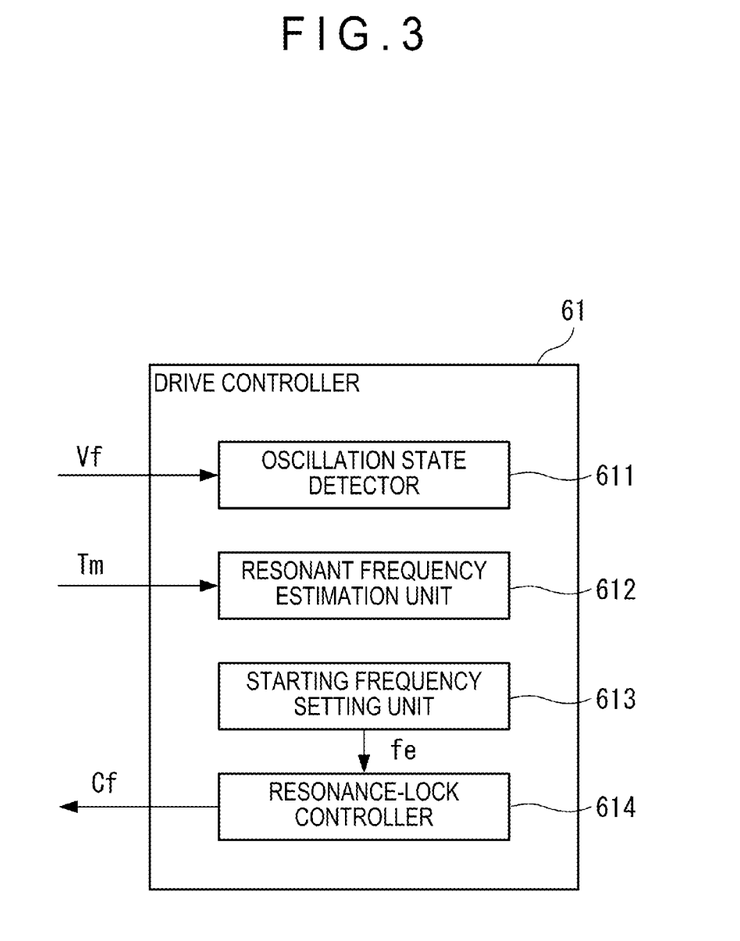
FIG. 3 is a block diagram showing a drive controller in the first exemplary embodiment.

The drive controller 61 outputs a sinusoidal alternating-current signal as the drive signal Cf. The drive controller 61 includes an oscillation state detector 611, a resonant frequency estimation unit 612, a starting frequency setting unit 613, and a resonance-lock controller 614 as shown in FIG. 3.

The oscillation state detector 611 detects an oscillation state Vf of the lens system 3 oscillating in response to the drive signal Cf. Examples of the oscillation state Vf of the lens system 3 include an effective power Rp, voltage, current, and voltage-current phase difference to be applied to the lens system 3. Alternatively, the oscillation state Vf of the lens system 3 may be detected by an oscillation sensor provided in the lens system 3 and acquired by the oscillation state detector 611.

The resonant frequency estimation unit 612 acquires the temperature information Tm of the lens system 3 from the temperature sensor 8 and calculates an estimated value fe of the resonant frequency of the lens system 3 on a basis of the temperature information Tm.

Here, the resonant frequency of the lens system 3 is determined by characteristics of the lens system 3 and the temperature information Tm of the lens system 3. Accordingly, in the exemplary embodiment, a table or a calculation formula which shows a relationship between the temperature information Tm and the resonant frequency of the lens system 3 is stored in advance in the memory 64. The resonant frequency estimation unit 612 can calculate the estimated value fe by performing calculation based on the table or the calculation formula stored in the memory 64 using the temperature information Tm acquired from the temperature sensor 8.

The starting frequency setting unit 613 sets the starting frequency of the lens system 3 on the basis of the estimated value fe calculated by the resonant frequency estimation unit 612. The starting frequency of the lens system 3 means the frequency of the drive signal Cf to be inputted to the lens system 3 when the lens system 3 is started. Detailed operations of the starting frequency setting unit 613 will be described later.

The resonance-lock controller 614 controls the excitation frequency to follow the resonant frequency of the lens system 3 on the basis of the oscillation state Vf of the lens system 3 detected by the oscillation state detector 611. It should be noted that JP 2018-189700 A can be referred to for detailed operations of the resonance-lock controller 614.

Referring back to FIG. 2, the illumination controller 62 controls an illumination timing of the pulsed light illuminator 5 by the illumination signal Ci. For instance, when the illumination controller 62 outputs the illumination signal Ci at a timing of the drive signal Cf reaching a predetermined phase, the measurement target 9 is pulsed-illuminated at the focus position Pf corresponding to the phase.

The image-detection controller 63 controls, with the image detection signal Cc, a timing when the image detector 4 detects an image. The image detector 4 detects the image Lg during a period from turning on to turning off of the image detection signal Cc and outputs the detected image Lg as the detected image Im corresponding to one frame.

A general-purpose personal computer is used as the controlling PC 7. The controlling PC 7 performs various settings on the lens controller 6 by running dedicated software on the controlling PC 7. For instance, by running lens operation software, the controlling PC 7 functions as a lens operation unit 71 that operates the lens controller 6 and, by running image processing software, the controlling PC 7 functions as an image processor 72 that acquires the detected image Im from the image detector 4 and processes the detected image Im.

The controlling PC 7 also includes an operation interface 73 configured to receive a user's operation performed on the variable focal length lens device 1.

Steps of Starting Frequency Setting Process

Figure 4:
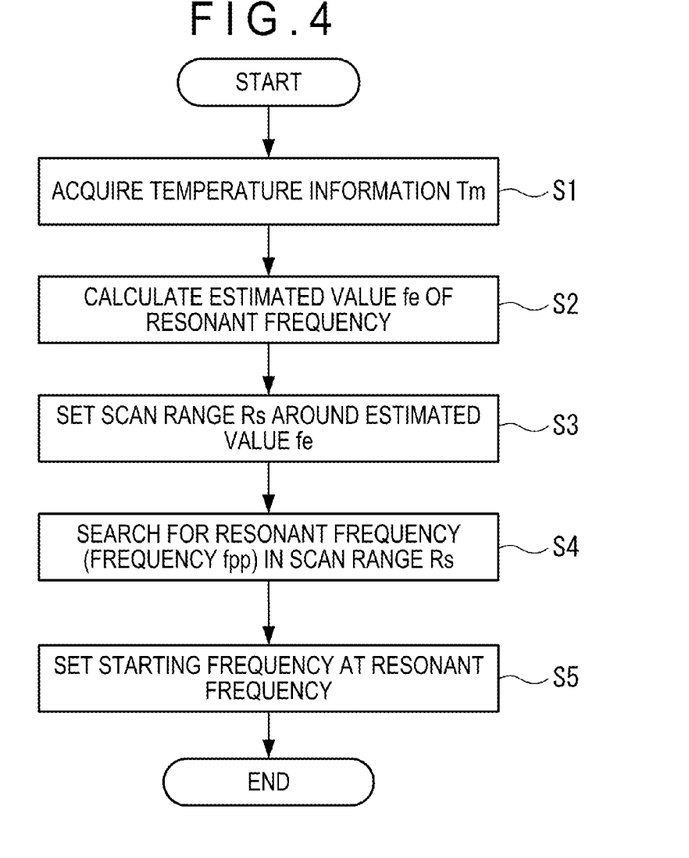
FIG. 4 is a flow chart showing steps of a starting frequency setting process in the first exemplary embodiment.

FIG. 4 is a flow chart showing steps of a starting frequency setting process in the exemplary embodiment. For instance, when an operator operates the operation interface 73 to cause the lens operation unit 71 to input a start command of the lens system 3 to the drive controller 61, the starting frequency setting process shown in FIG. 4 starts.

As shown in FIG. 4, first, the resonant frequency estimation unit 612 acquires the temperature information Tm of the lens system 3 from the temperature sensor 8 (Step S1), and calculates the estimated value fe of the resonant frequency of the lens system 3 by performing calculation based on the table or the calculation formula stored in the memory 64 using the acquired temperature information Tm (Step S2: resonant frequency estimation step).

Next, the starting frequency setting unit 613 sets a scan range Rs including a frequency of the estimated value fe (Step S3). This scan range Rs is, for instance, a range including the estimated value fe as a center and is set narrower than a typical scan range.

Next, the starting frequency setting unit 613 searches for the resonant frequency of the lens system 3 by sweeping the frequency (excitation frequency) of the drive signal Cf applied to the lens system 3 in the scan range Rs set in Step S3 (Step S4).

Detailed process in Step S4 is similar to a typical frequency scanning process (see FIG. 10). In Step S4, a frequency fpp at which a peak value pp of the effective power Rp is obtainable is stored as the resonant frequency (see FIG. 5). Here, the scan range Rs in the exemplary embodiment is narrower than a typical scan range (see FIG. 11).

Figure 5:
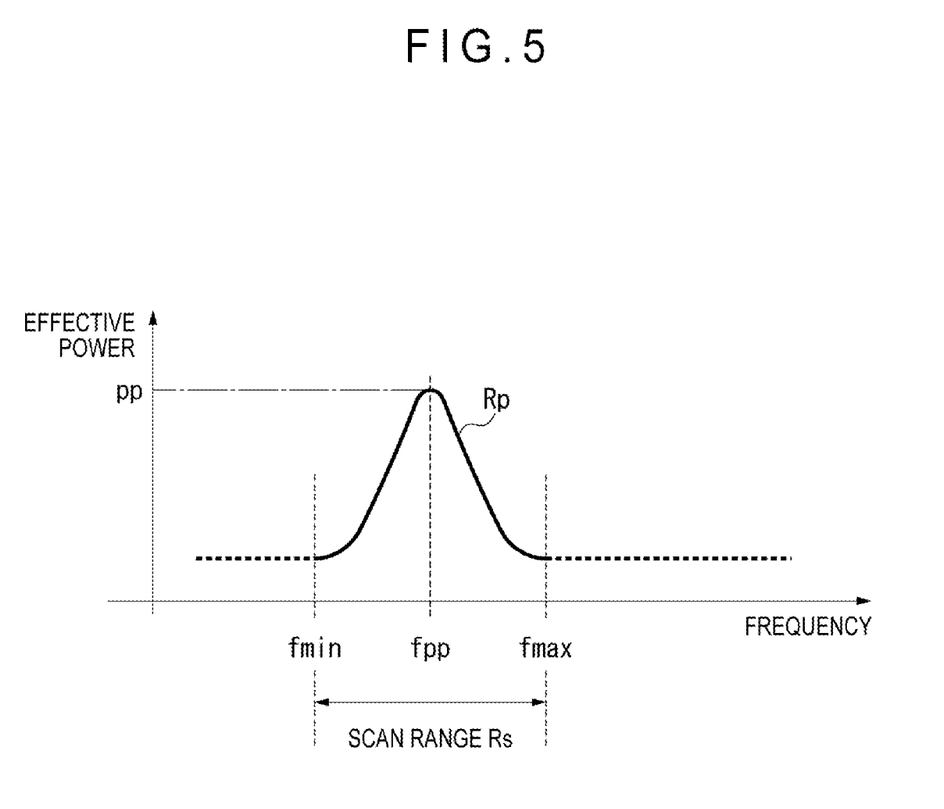
FIG. 5 is a graph for explaining the starting frequency setting process in the first exemplary embodiment.

It should be noted that a state where the effective power Rp exhibits the peak value pp corresponds to a target oscillation state of the lens system 3 in the exemplary embodiment.

Next, the starting frequency setting unit 613 sets the starting frequency at the frequency fpp stored as the resonant frequency in Step S4 (Step S5). Steps S3 to S5 correspond to the starting frequency setting step of the invention.

With the above operations, the starting frequency setting process shown in FIG. 4 ends. Subsequently, the drive controller 61 transmits the drive signal Cf adjusted to the starting frequency (frequency fpp) to the lens system 3. This operation causes a standing wave to be formed in the lens system 3, bringing the lens system 3 into a working state.

After the lens system 3 is started, the resonance-lock controller 614 performs lock control of the drive signal Cf. Specifically, the resonance-lock controller 614 monitors a change in the resonant frequency of the lens system 3 by acquiring the effective power Rp in a predetermined cycle and monitoring a change (decrease or increase) in the effective power Rp. When the effective power Rp changes, the resonance-lock controller 614 controls the excitation frequency to follow the resonant frequency of the lens system 3 by increasing or decreasing the excitation frequency with reference to the oscillation state Vf other than the effective power Rp of the lens system 3.

Advantage(s) of First Exemplary Embodiment

As described above, the resonant frequency of the lens system 3 in the exemplary embodiment is determined by characteristics of the lens system 3 and the temperature of the lens system 3. Accordingly, the resonant frequency estimation unit 612 can calculate the estimated value fe of the resonant frequency of the lens system 3 on the basis of the temperature information of the lens system 3 by using the table or the calculation formula prepared in advance. The starting frequency setting unit 613 can set the starting frequency of the lens system 3 on the basis of the calculated estimated value fe.

In particular, in the exemplary embodiment, the starting frequency can be detected in the scan range Rs limited to include the estimated value fe. In such an exemplary embodiment, the scan range Rs in the frequency scanning process can be limited to a predetermined range including the estimated value fe. In other words, since the scan range can be limited to the narrower range than a typical one in the exemplary embodiment, the time required for starting the lens system 3 can be shortened while performing the frequency scanning process.

Second Exemplary Embodiment

A second exemplary embodiment of the invention will be described with reference to FIG. 6.

In the second exemplary embodiment, while having a configuration in common with the configuration of the above-described variable focal length lens device 1 in the first exemplary embodiment, the starting frequency setting process is carried out by a different method from the method in the first exemplary embodiment.

Figure 6:
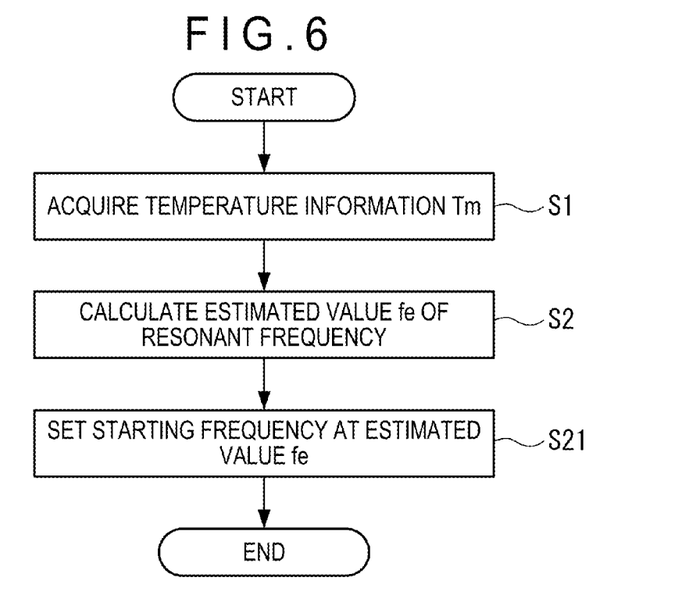
FIG. 6 is a flow chart for showing steps of a starting frequency setting process in a second exemplary embodiment of the invention.

FIG. 6 is a flow chart showing detailed steps of the starting frequency setting process in the second exemplary embodiment. For instance, when an operator operates the operation interface 73 to cause the lens operation unit 71 to input a start command of the lens system 3 to the drive controller 61, the starting frequency setting process shown in FIG. 6 starts.

In FIG. 6, Step S1 and Step S2 are the same as those in the first exemplary embodiment. Specifically, the resonant frequency estimation unit 612 acquires the temperature information Tm of the lens system 3 from the temperature sensor 8 (Step S1) and calculates the estimated value fe of the resonant frequency on the basis of the temperature information Tm (Step S2).

Next, the starting frequency setting unit 613 sets the starting frequency at the estimated value fe calculated in Step S2 (Step S21: starting frequency setting step).

With the above operations, the starting frequency setting process shown in FIG. 6 ends. Subsequently, the drive controller 61 transmits the drive signal Cf adjusted to the starting frequency (estimated value fe) to the lens system 3. This operation causes a standing wave to be formed in the lens system 3, bringing the lens system 3 into a working state.

In the above-described starting frequency setting process in the second exemplary embodiment, the estimated value fe is directly used as the starting frequency without performing the frequency scanning process as in the first exemplary embodiment. In other words, in the second exemplary embodiment, the time required for the frequency scanning process can be omitted, so that the time required for starting the lens system 3 can be further shortened.

Third Exemplary Embodiment

Figure 7:
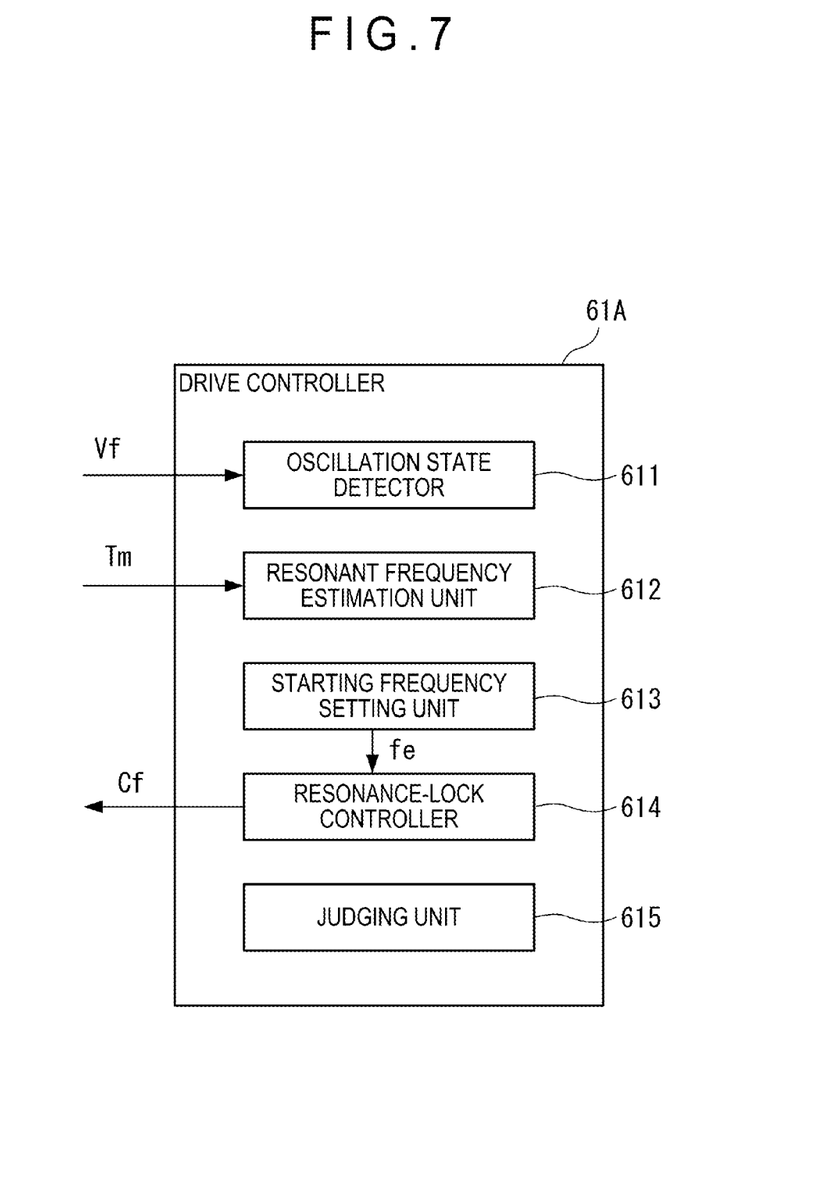
FIG. 7 is a block diagram showing a drive controller in a third exemplary embodiment of the invention.

A third exemplary embodiment of the invention will be described with reference to FIGS. 7 and 8.

In the third exemplary embodiment, the starting frequency is set by a different method from the above-described methods in the first and second exemplary embodiments. In the third exemplary embodiment, a drive controller 61A further includes a judging unit 615 shown in FIG. 7 in addition to various functions of the drive controller 61 of the first exemplary embodiment. The judging unit 615 of the third exemplary embodiment corresponds to an elapsed time judging unit of the invention. The judging unit 615 judges whether a predetermined time has elapsed since the last stop time of the lens system 3 when the drive controller 61A receives a start command of the lens system 3 after the lens system 3 stops.

Figure 8:
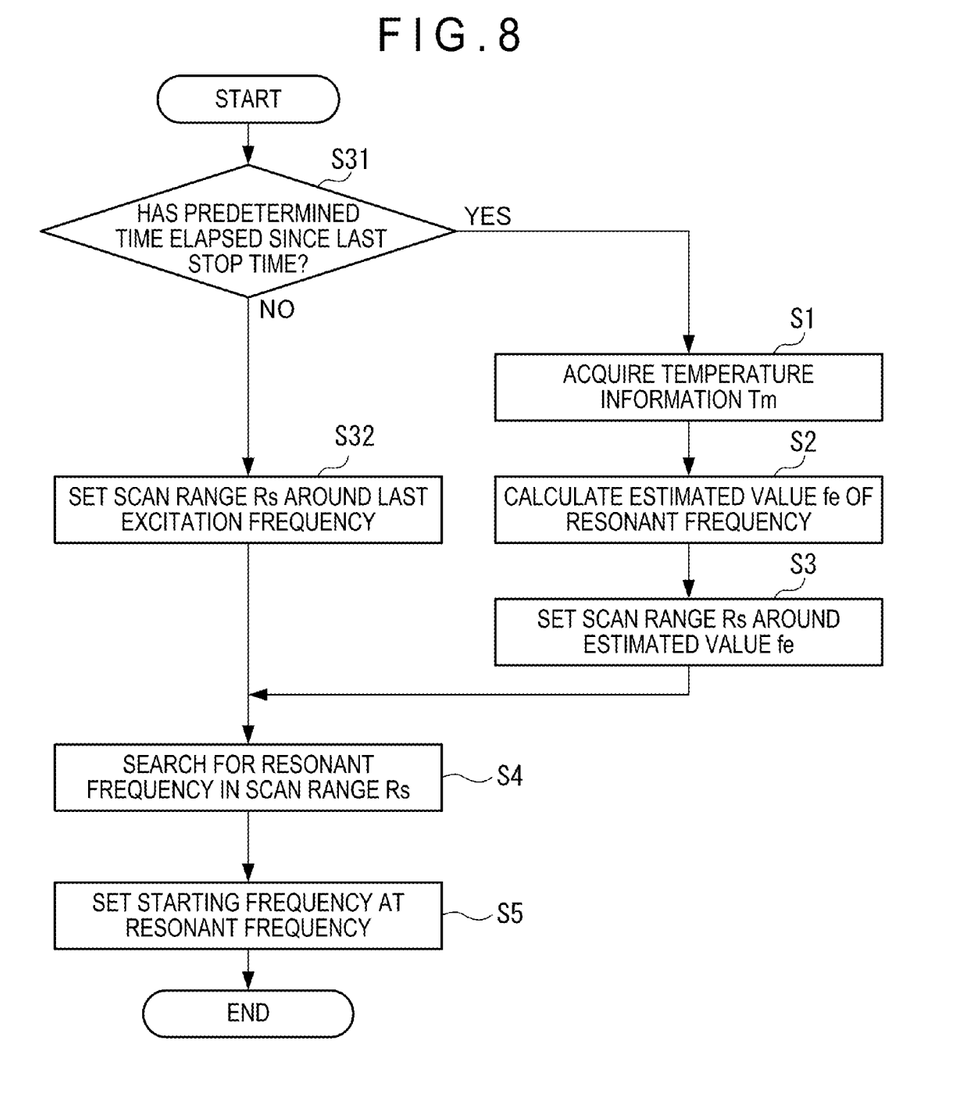
FIG. 8 is a flow chart showing steps of a starting frequency setting process in the third exemplary embodiment.

FIG. 8 is a flow chart showing detailed steps of the starting frequency setting process in the third exemplary embodiment. For instance, when an operator operates the operation interface 73 to cause the lens operation unit 71 to input a start command of the lens system 3 to the drive controller 61, the starting frequency setting process shown in FIG. 8 starts.

In FIG. 8, first, the judging unit 615 judges whether a predetermined time (e.g., several seconds to several minutes) has elapsed until the current time since the last stop time of the lens system 3 (Step S31).The last stop time of the lens system 3 is stored, for instance, in the memory 64.

When it is judged in Step S31 that the predetermined time has elapsed (Step S31: when the judgement is Yes), Steps S1 to S3 are performed in the same manner as in the first exemplary embodiment to set the scan range Rs including the estimated value fe.

On the other hand, when it is judged in Step S31 that the predetermined time has not elapsed (Step S31: when the judgement is No), the starting frequency setting unit 613 acquires information of the last excitation frequency and sets the scan range Rs around the acquired excitation frequency (Step S32).

Here, the last excitation frequency means the excitation frequency that is controlled by the resonance-lock controller 614 to follow the resonant frequency of the lens system 3 while the lens system 3 is in the previous working time, the excitation frequency being stored in the memory 64. Moreover, the scan range Rs set here is, for instance, a range including the last excitation frequency as a center and is set narrower than a typical scan range.

Subsequent to Step S3 or Step S32, Step S4 and subsequent steps are performed in the same manner as in the first exemplary embodiment.

Specifically, by sweeping the excitation frequency in the scan range Rs, the starting frequency setting unit 613 searches for the resonant frequency of the lens system 3 (Step S4), and sets the starting frequency at the resonant frequency (frequency fpp) (Step S5).

With the above operations, the starting frequency setting process shown in FIG. 8 ends. Subsequently, the drive controller 61 transmits the drive signal Cf adjusted to the starting frequency to the lens system 3. This operation causes a standing wave to be formed in the lens system 3, bringing the lens system 3 into a working state.

In starting frequency setting process of the third exemplary embodiment, when a restart time of the lens system 3 falls within a predetermined duration of time elapsed since the stop time of the lens system 3, it is assumed that a temperature state of the lens system 3 is not significantly changed and the resonant frequency of the lens system 3 is not significantly changed. In such a case, a standing wave can be obtained in the lens system 3 by using, as the starting frequency, excitation frequency adjusted by the resonance-lock controller 614 immediately before the lens system 3 is stopped. With this operation, the time required for calculating the estimated value fe can be omitted, so that the time required for starting the lens system 3 can be further shortened.

Fourth Exemplary Embodiment

A fourth exemplary embodiment of the invention will be described with reference to FIG. 9.

In the fourth exemplary embodiment, while having a configuration in common with the configuration of the above-described variable focal length lens device 1 in the third exemplary embodiment (see FIG. 7), the starting frequency setting process is carried out by a different method from the method in the third exemplary embodiment. Specifically, the judging unit 615 of the fourth exemplary embodiment corresponds to a temperature change judging unit of the invention. The judging unit 615 judges whether a difference (temperature difference ΔT) between the temperature information Tm of the lens system 3 at the current time and the temperature information Tm of the lens system 3 at the last working stop time of the lens system 3 falls within a predetermined range.

Figure 9:
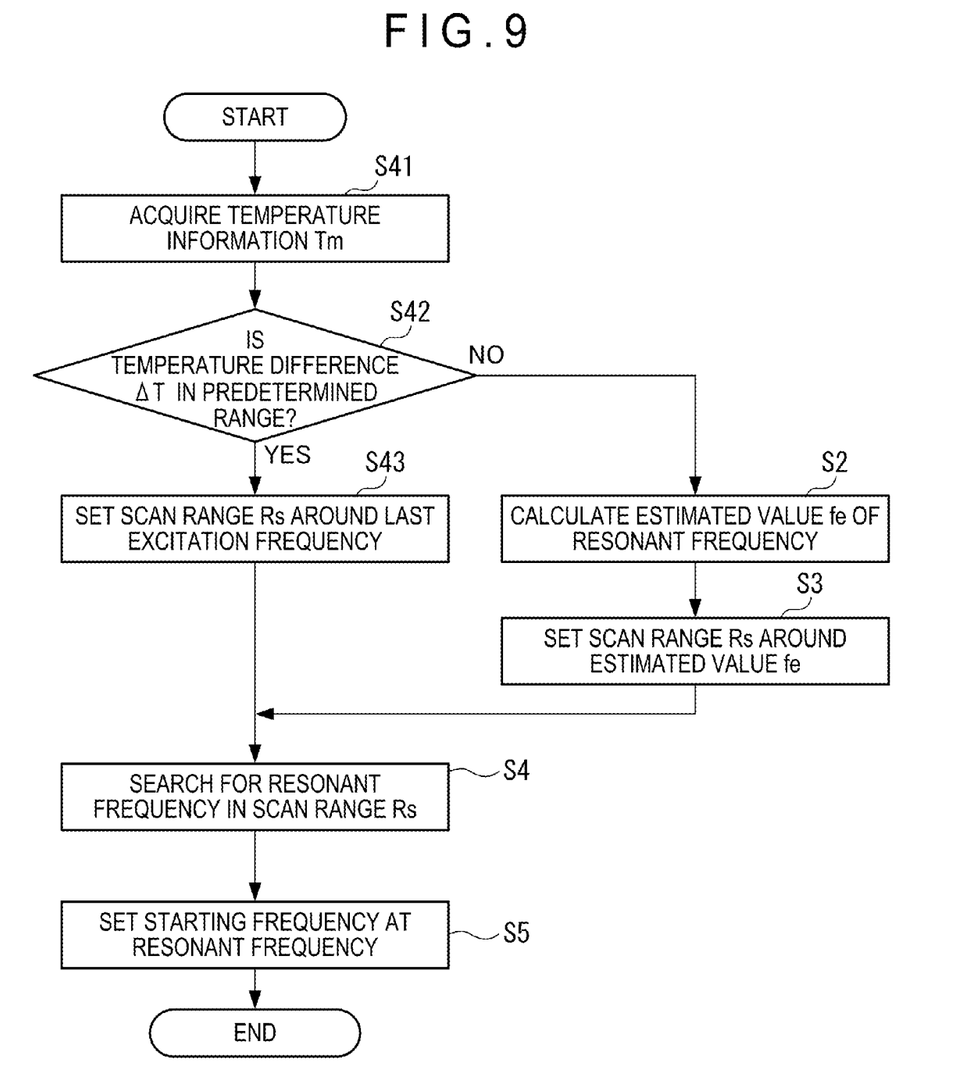
FIG. 9 is a flow chart for showing steps of a starting frequency setting process in a fourth exemplary embodiment of the invention.

FIG. 9 is a flow chart showing detailed steps of the starting frequency setting process in the fourth exemplary embodiment. For instance, when an operator operates the operation interface 73 to cause the lens operation unit 71 to input a start command of the lens system 3 to the drive controller 61, the starting frequency setting process shown in FIG. 9 starts.

As shown in FIG. 9, the judging unit 615 acquires the temperature information Tm of the lens system 3 at the current time from the temperature sensor 8 (Step S41). The judging unit 615 judges whether a difference (temperature difference ΔT) between the temperature information Tm of the lens system 3 at the current time and the temperature information Tm of the lens system 3 at the last working stop time of the lens system 3 falls within a predetermined range (Step S42).

Here, the predetermined range relating to the temperature difference ΔT is set as desired in a range where the resonant frequency of the lens system 3 is not significantly changed. Moreover, the temperature information Tm of the lens system 3 at the working stop time thereof is stored in the memory 64.

When it is judged in Step S42 that the temperature difference ΔT falls within the predetermined range (Step S42: when the judgement is Yes), the starting frequency setting unit 613 acquires information of the last excitation frequency and sets the scan range Rs around the acquired excitation frequency (Step S43).

Here, the same as in the third exemplary embodiment, the last excitation frequency means the excitation frequency that is controlled by the resonance-lock controller 614 to follow the resonant frequency of the lens system 3 at the last working time of the lens system 3, the excitation frequency being stored in the memory 64. Moreover, the scan range Rs set here is, for instance, a range including the last excitation frequency as a center and is set narrower than a typical scan range.

On the other hand, when it is judged in Step S42 that the temperature difference ΔT falls out of the predetermined range (Step S42: when the judgement is No), Steps S2 and S3 are performed in the same manner as in the first exemplary embodiment to set the scan range Rs including the estimated value fe.

Subsequent to Step S3 or Step S43, Step S4 and subsequent steps are performed in the same manner as in the first exemplary embodiment.

Specifically, by sweeping the excitation frequency in the scan range Rs, the starting frequency setting unit 613 searches for the resonant frequency of the lens system 3 (Step S4), and sets the starting frequency at the resonant frequency (frequency fpp) (Step S5).

With the above operations, the starting frequency setting process shown in FIG. 9 ends. Subsequently, the drive controller 61 transmits the drive signal Cf adjusted to the starting frequency to the lens system 3. This operation causes a standing wave to be formed in the lens system 3, bringing the lens system 3 into a working state.

In the starting frequency setting process of the fourth exemplary embodiment, when the temperature information Tm at the restart of the lens system 3 has not been changed significantly from the temperature information Tm at the last stop time when the lens system 3 stops working, the excitation frequency adjusted by the resonance-lock controller 614 immediately before the lens system 3 stops working last can be used as the starting frequency. With this operation, the time required for calculating the estimated value fe can be omitted, so that the time required for starting the lens system 3 can be further shortened.

Modification(s)

It should be understood that the scope of the invention is not limited to the above-described exemplary embodiments but includes modifications and the like compatible with an object of the invention.

Although the frequency fpp (resonant frequency) of the drive signal Cf, at which the effective power Rp of the lens system 3 exhibits a peak, is detected as the starting frequency in the first exemplary embodiment, the detection of the starting frequency is not limited thereto.

For instance, when the resonance-lock controller 614 performs the lock control in a manner different from the method described in the first exemplary embodiment (see, for instance, JP 2018-189700 A), a target frequency in the lock control may be detected as the starting frequency from the scan range Rs. Specifically, one of two frequencies at which the effective power Rp exhibits a predetermined ratio relative to the peak value may be detected as the starting frequency. Alternatively, a frequency at which a current-voltage phase difference, which is a difference between a current and a voltage applied to the lens system 3, exhibits a peak may be detected as the starting frequency.

Although the estimated value fe of the resonant frequency of the lens system 3 is directly set as the starting frequency in the second exemplary embodiment, the setting of the starting frequency is not limited thereto. For instance, when one of two frequencies at which the effective power Rp exhibits a predetermined ratio relative to the peak value is defined as a target frequency in the lock control, a frequency obtained by increasing or decreasing the estimated value fe by a predetermined amount may be set as the starting frequency.

In the third and fourth exemplary embodiments, subsequent to Steps S32 and S43, the scanning process may be omitted and the last excitation frequency may be directly set as the starting frequency.

In the above exemplary embodiments, the lens controller 6 and the controlling PC 7 are used in combination in order to drive and control the lens system 3. However, the lens controller 6 and the controlling PC 7 may be an integrated device configured to collectively drive, control and operate the lens system 3.

The drive signal Cf, which is in a sinusoidal waveform to cause sinusoidal oscillation at the focus position Pf in the above exemplary embodiments, may be a triangular waveform, saw-tooth waveform, rectangular waveform, or the like.

The variable focal length lens device of the invention is not limited to such an application to an image detection device as described in the above exemplary embodiments, but is also applicable to, for instance, an optical displacement gauge utilizing a variable focal length Df.

What is claimed is:

1. A variable focal length lens device comprising:
   a lens system of a liquid resonant type whose refractive index is changed in response to a drive signal to be inputted;
   a temperature sensor configured to acquire temperature information of the lens system;
   a resonant frequency estimation unit configured to calculate an estimated value of a resonant frequency of the lens system on a basis of the temperature information; and
   a starting frequency setting unit configured to set a starting frequency of the lens system on a basis of the estimated value.

2. The variable focal length lens device according to claim 1, wherein
   the starting frequency setting unit sets a scan range comprising the estimated value, detects a frequency of the drive signal, at which the lens system is in a target oscillation state, within the scan range, and sets the frequency as the starting frequency.

3. The variable focal length lens device according to claim 1, further comprising:
   a resonance-lock controller configured to control the drive signal to follow the resonant frequency of the lens system during working of the lens system; and
   an elapsed time judging unit configured to judge, after the lens system stops, whether a predetermined time has elapsed since a stop time of the lens system, wherein
   the starting frequency setting unit sets the starting frequency on a basis of the estimated value when it is judged that the predetermined time has elapsed, and
   sets the starting frequency at a frequency adjusted by the resonance-lock controller immediately before the lens system stops when it is judged that the predetermined time has not elapsed.

4. The variable focal length lens device according to claim 1, further comprising:
   a resonance-lock controller configured to control the drive signal to follow the resonant frequency of the lens system during working of the lens system; and
   a temperature change judging unit configured to judge whether a difference between the temperature information of the lens system at a current time and the temperature information of the lens system at a last time when the lens system stops working falls within a predetermined range, wherein
   the starting frequency setting unit sets the starting frequency at a frequency adjusted by the resonance-lock controller immediately before the lens system stops when it is judged that the difference falls within the predetermined range, and
   sets the starting frequency on a basis of the estimated value when it is judged that the difference falls out of the predetermined range.

5. A variable focal length lens control method by using a variable focal length lens device comprising: a lens system of a liquid resonant type whose refractive index is changed in response to a drive signal to be inputted; and a temperature sensor configured to acquire temperature information of the lens system, the control method comprising:
   calculating an estimated value of a resonant frequency of the lens system on a basis of the temperature information; and
   setting a starting frequency of the lens system on a basis of the estimated value.

\* \* \* \* \*